No. 727,644. PATENTED MAY 12, 1903.
J. W. LATIMER.
MOWING MACHINE.
APPLICATION FILED JAN. 16, 1902.
NO MODEL. 4 SHEETS—SHEET 1.
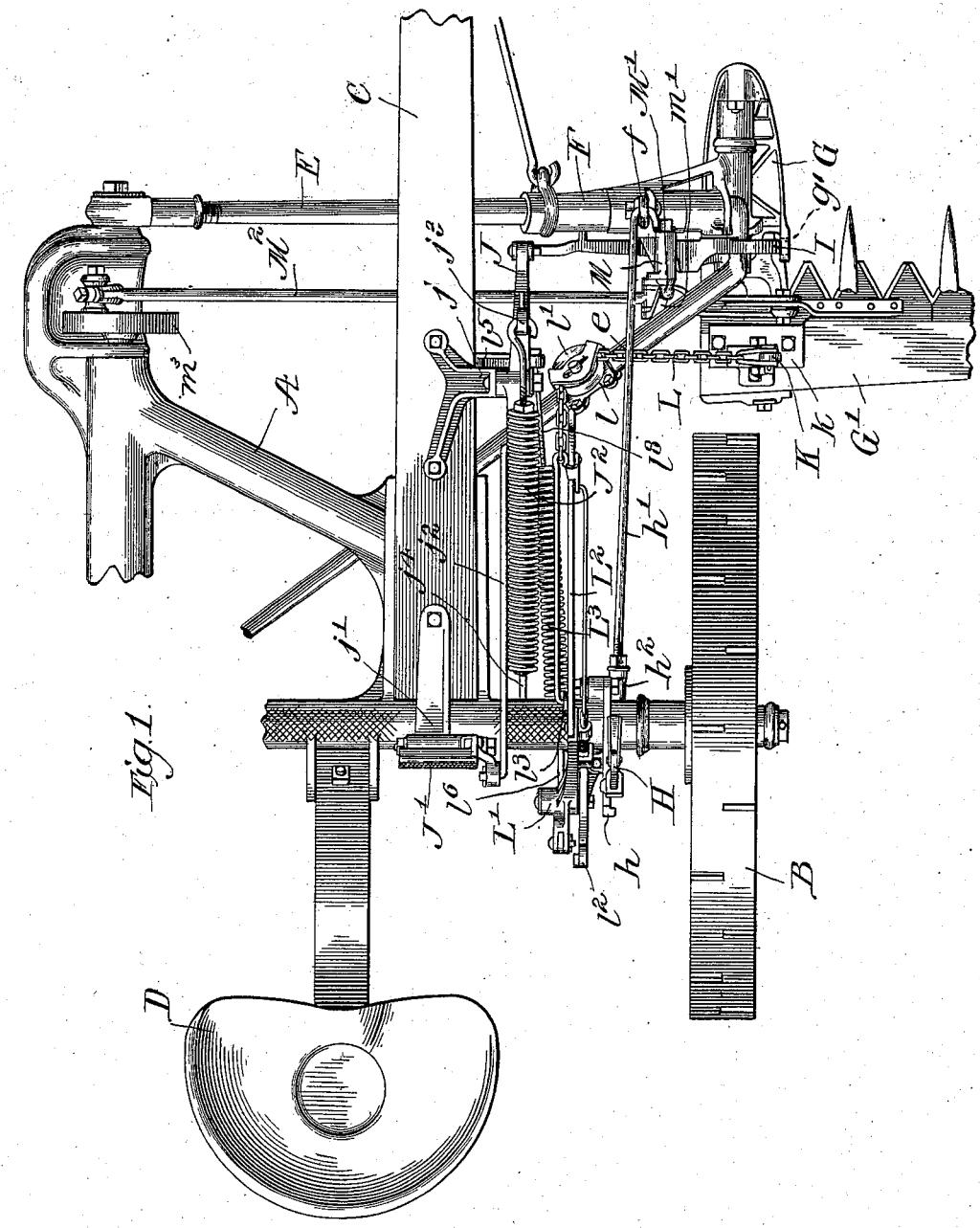
Witnesses:
Edw. Barrett
C. W. Smith
Inventor
John W. Latimer
By J. F. Steward.
Atty.

No. 727,644. PATENTED MAY 12, 1903.
J. W. LATIMER.
MOWING MACHINE.
APPLICATION FILED JAN. 16, 1902.
NO MODEL. 4 SHEETS—SHEET 2.
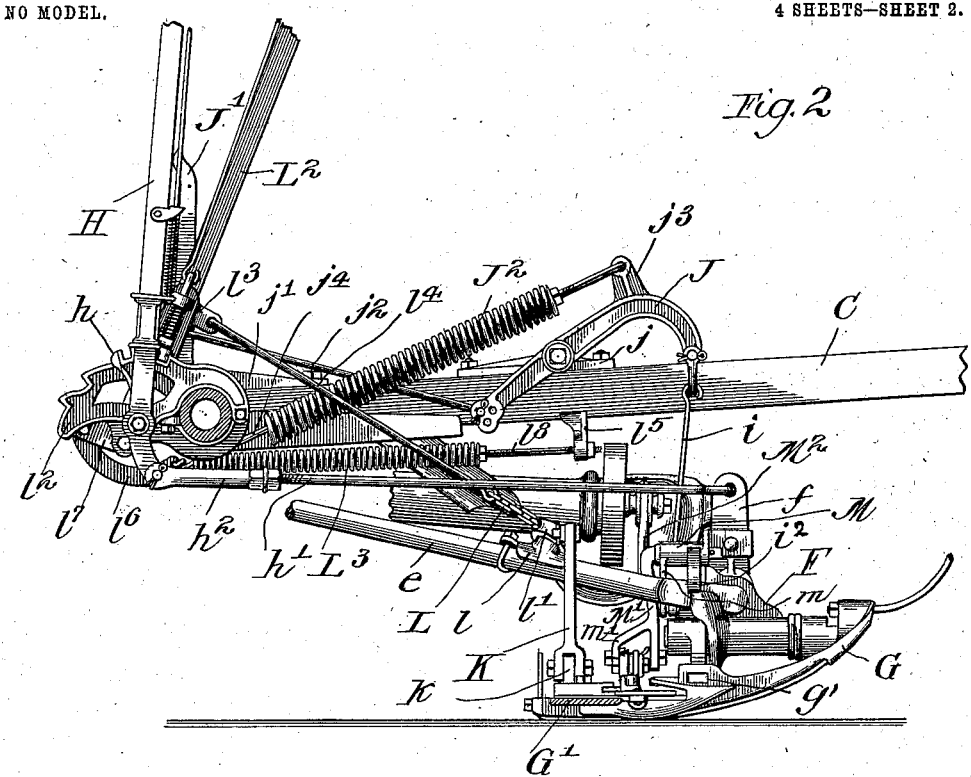
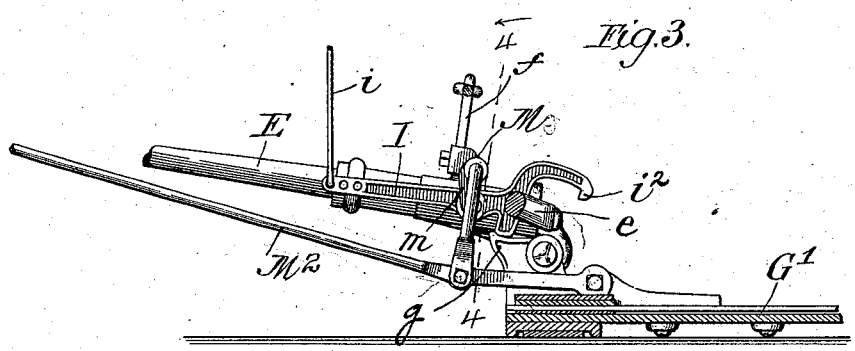

No. 727,644. PATENTED MAY 12, 1903.
J. W. LATIMER.
MOWING MACHINE.
APPLICATION FILED JAN. 16, 1902.
NO MODEL. 4 SHEETS—SHEET 3.
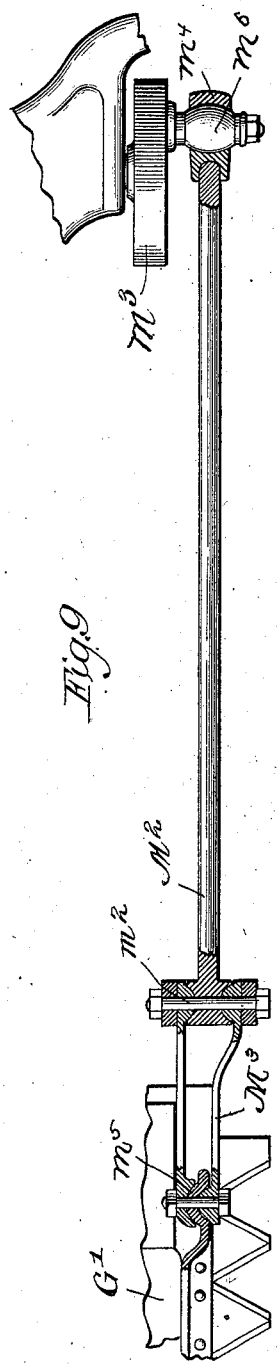
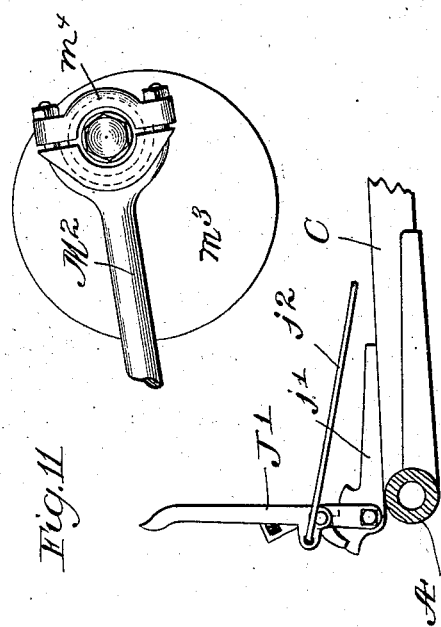
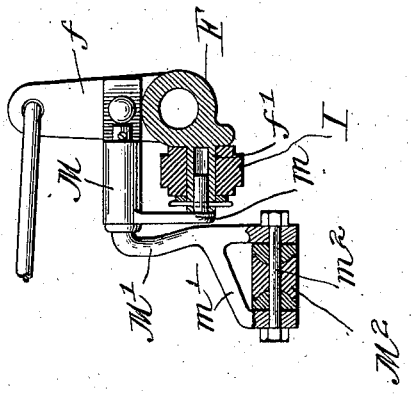
Witnesses:
Inventor.
John W. Latimer
By J. F. Steward
Atty.

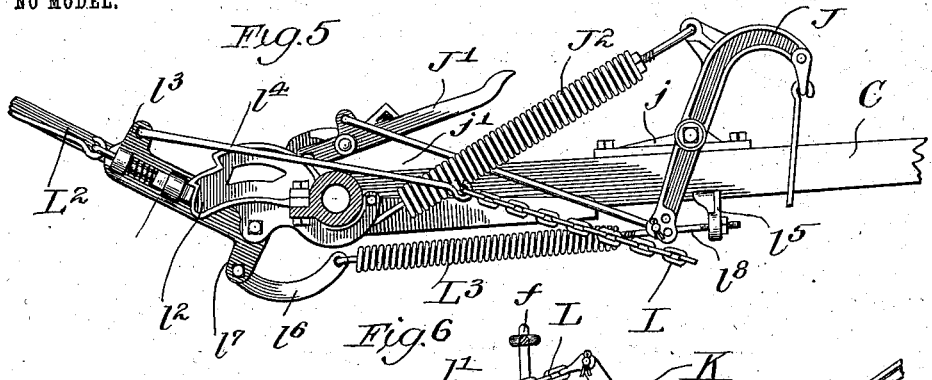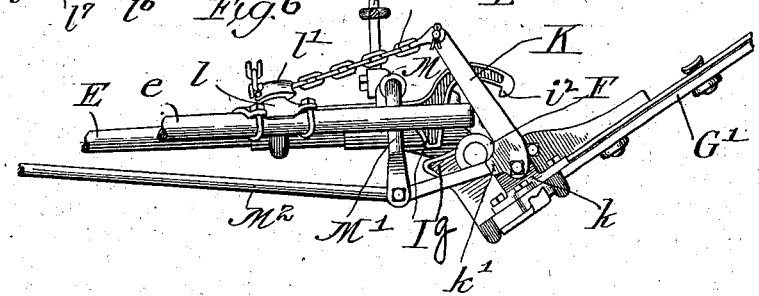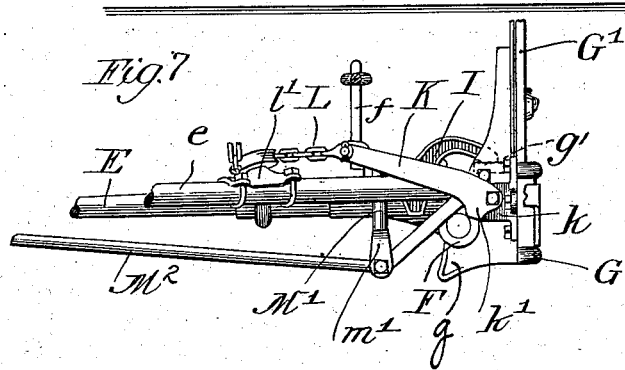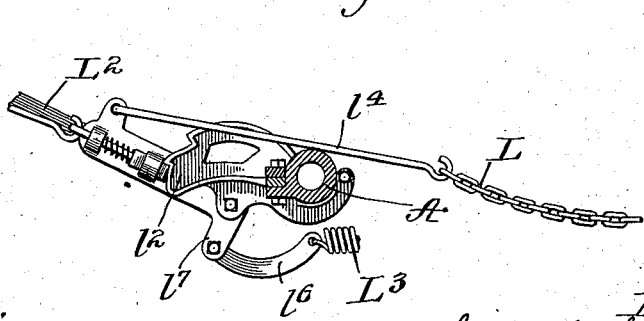

No. 727,644. Patented May 12, 1903.

UNITED STATES PATENT OFFICE.

JOHN W. LATIMER, OF CHICAGO, ILLINOIS, ASSIGNOR TO INTERNATIONAL HARVESTER COMPANY, A CORPORATION OF NEW JERSEY.

MOWING-MACHINE.

SPECIFICATION forming part of Letters Patent No. 727,644, dated May 12, 1903.

Application filed January 16, 1902. Serial No. 89,967. (No model.)

*To all whom it may concern:*

Be it known that I, JOHN W. LATIMER, a citizen of the United States, residing at No. 1141 Dunning street, Chicago, in the county of Cook and State of Illinois, have invented certain new and useful Improvements in Mowing-Machines, of which the following is a specification, reference being had to the accompanying drawings.

My invention has for its object to provide means whereby the finger-bar may be raised to an approximately vertical position from the operator's seat and also means which permits the driving-gearing, and consequently the knife, to remain in motion regardless of the position of the finger-bar. As here shown, the parts are applied to a mower of well-known construction.

In the drawings, Figure 1 is a plan view of so much of a mower as necessary to illustrate my invention. Fig. 2 is a grass side elevation of the parts shown in Fig. 1 with the traction-wheel removed. Fig. 3 is a rear elevation of a portion of parts of the cutting apparatus and pitman, showing the means for connecting the latter to the knife. Fig. 4 is a sectional elevation of the swivel-hinge on the line 4 4 of Fig. 3, showing the means for pivoting the vibrating hinges. Fig. 5 is a side elevation of the means for lifting the finger-bar. Fig. 6 is a rear view of a portion of the cutting apparatus, showing the finger-bar in a partially-folded position. Fig. 7 is a view of the same as Fig. 6, but showing the finger-bar folded in a vertical position. Fig. 8 is a side elevation of the folding hand-lever and its connections in their positions when finger-bar is folded to its highest position. Fig. 9 is a plan view of the pitman and part of the knife, showing means for connecting the parts. Fig. 10 represents the pitman and crank-wheel and shows the manner of connecting them. Fig. 11 represents the lever and quadrant by which the cutting apparatus is controlled by the driver.

A represents a portion of the main frame of a mower of the "Deering" type, upon which the usual driving-gearing is mounted; B, one of the traction-wheels; C, the draft-tongue, and D the operator's seat. Pivoted to the main frame A is the coupling-frame E, on which is placed the swivel-hinge F. To said swivel-hinge is pivoted the shoe G, to which in turn is secured the finger-bar G'. As thus far described I claim no novelty in the parts illustrated, as they enter into the construction of the well-known mowing-machine above referred to.

As one part with the swivel-hinge F is the vertical post $f$. Upon the main frame A is secured the ratchet-quadrant $h$, to which is pivoted the tilting-lever H. The said tilting-lever is provided with the usual latch-handle and latch operated thereby, the latter adapted to engage the teeth of the quadrant $h$. The lower end of the tilting-lever H is connected to the post $f$ of the swivel-hinge F by means of the rod $h'$, the front end of which is hooked in the said post $f$. The rear end is threaded and screwed into the socket $h^2$, which in turn is pivoted to the lower end of said tilting-lever. By means of this lever the swivel-hinge and shoe, and consequently the finger-bar, may be tilted relative to the ground and there maintained in any position desired. The socket $h^2$ provides means for adjusting the length of the rod $h'$, and consequently the tilt.

Upon a suitable stud $f'$ upon the swivel-hinge F, preferably in one part therewith, is pivoted the gag-lever I. (See Fig. 3.) One end of said gag-lever is adapted to bear upon the lug $g$ of the shoe G. The opposite end is adapted to be connected, by means of the link $i$, to the bell-crank lever J, (see Fig. 2,) which is pivoted on a stud formed on the bracket $j$, secured to the draft-tongue C. To the main frame is secured a second quadrant $j'$, in which is pivoted the lifting foot-lever $J'$, provided with a spring-actuated pawl adapted to engage a notch in the quadrant. Said bell-crank lever J is operated by the foot-lever by means of the link $j^2$, which is connected to each. The spring $J^2$ is connected at its one end to the arm $j^3$ of the bell-crank lever J and at its other end to a lug on the main frame. By means of the threaded bolt $j^4$ the spring $J^2$ may be adjusted to any required tension.

By means of the lifting foot-lever (shown in its two positions in Figs. 2 and 5) the cutting apparatus as a whole may be raised a sufficient height from the ground to pass small obstructions and turn at the corners of the field, yet remain substantially parallel therewith, the hinge in the shoe G being made rigid by means of the gag-lever I, so that the outer end of the cutting apparatus will be raised simultaneously with the inner end. The purpose of the spring $J^2$ is to cause the cutting apparatus to move lightly over the ground and also aid the operator to raise the bar, as above stated.

Secured to the finger-bar immediately above the shoe G is the block $k$, to which is pivoted the standard K. (Best shown in Figs. 6 and 7.) The short stop-arm $k'$ in one part with said standard K is adapted to rest upon a part of said block, and thus prevent the said standard from being drawn over stubbleward. The finger-bar folding chain L is attached to the upper end of the standard K. Upon the part $e$ of the coupling-frame E is secured the saddle $l$, upon a stud of which is journaled the sheave $l'$. Around this sheave the said folding chain passes to change its direction. Secured to the main frame is the quadrant $l^2$, to which is pivoted the lever $L^2$. To the arm $l^3$ of said lever $L^2$, which is provided with the usual latch-handle and latch operated thereby adapted to engage the ratchets of the quadrant, is connected the end of the folding chain L through the rod $l^4$. The spring $L^3$ is connected at one end to the bracket $l^5$, secured to the draft-tongue, and at the other to the bent link $l^6$, which in turn is pivoted to the arm $l^7$ of the lever $L^2$, as shown in Figs. 2 and 5. Said spring is adjusted to any desired degree of tension by means of the threaded bolt $l^8$. By means of this last-mentioned lever the finger-bar may be raised at its outer end only to permit it to pass obstructions. In Fig. 6 its folded position for passing rocks and stumps is shown. When it is desired to fold it further and maintain it in a practically vertical position, as when traveling on the road, the operator moves the lever $L^2$ a sufficient additional distance to engage the hook portion $i^2$ of the gag-lever I with the eye $g'$ of the shoe G. (Shown by dotted lines in Fig. 7.)

To disengage the gag-lever from the shoe, the finger-bar is tilted to its extreme rear position by means of the tilting-lever H, when the hooked portion $i^2$ engages the coupling-frame E and is raised out of the eye $g'$. The finger-bar may then be lowered by reversing the operation of raising it. As the means for maintaining the cutting apparatus in this elevation by means of the gag-lever and releasing the same forms no part of this invention, it will not be further described. Reference is made, however, to the patent granted to J. F. Steward, No. 596,796, dated January 4, 1898. When the finger-bar is on the ground, the folding lever is in its extreme forward position. This carries the link $l^6$ to the point beyond the dead-center of the arm $l^7$, so that the force of the spring $L^3$ becomes ineffective and has no influence on the outer end of the cutting apparatus. The spring $L^3$ is located in a like manner to spring $J^2$; but at its rear end the latter connects to lug under the axle by a screw-bolt. (Shown in Fig. 5.)

As one piece with the swivel-hinge F is the bracket M, secured to the standard $f$ and supported at its rear end by the down-reaching member $m$, (see Fig. 4,) which is inserted in a hole provided in the stud $f'$. In the said bracket is pivoted the vibrating hanger M', which is provided at its lower end with the yoke $m'$, adapted to support both ends of the pivot-bolt $m^2$. The pitman $M^2$, journaled at one end by a ball-joint $m^6$ upon the wrist-pin of the usual crank-wheel $m^3$, is pivotally supported at the other by the bolt $m^2$ between the members of the forked yoke $m'$. Pivoted in a like manner to the bolt $m^2$ is one end of the pitman extension $M^3$, the opposite end of which is connected to the reciprocating knife by a ball-joint $m^5$ in the usual manner. In order that the cutting apparatus may be rocked without the pitman, which in this instance rocks therewith, producing a cramping pressure on the wrist-pin of the crank-wheel, the pitman-box proper, $m^4$, is exteriorly spherical, as shown in Figs. 9 and 10.

What I claim as my invention, and desire to secure by Letters Patent, is—

1. In a mowing-machine, a gearing-frame, the coupling-frame pivoted thereto, the swivel-hinge F, the cutting apparatus pivotally connected thereto, and having a reciprocating knife, a crank upon the gearing-frame, a pitman in two parts, and a vibrating hanger pivoted to said swivel-hinge by means of which said pitman is controlled at the junction of its two parts, all combined substantially as described.

2. In a mowing-machine, a gearing-frame having a crank-shaft journaled therein, and provided with a crank, a coupling-frame pivoted to the said gearing-frame and adapted to rise and fall at its grassward end, a finger-bar secured to said coupling-frame by means permitting movement on two axes, whereby it may rock on a substantially horizontal axis transverse to the lateral advance of the machine and be folded upward at its outer end, a reciprocating knife, a jointed pitman connecting said crank to said reciprocating knife, and a down-hanger, secured to a support upon the coupling-frame, and connected to the joint of said pitman, means for raising the cutting apparatus simultaneously at both ends, and means for raising the outer end independently of the inner, all combined substantially as described.

3. In a mowing-machine, a gearing-frame having a cranked shaft journaled therein, a coupling-frame, a swivel-hinge pivoted to said coupling-frame, the finger-bar pivoted to said swivel-hinge, said parts having combined therewith the support M secured to the said swivel-hinge, a vibrating hanger pivoted in the said support, a reciprocating knife, said reciprocating knife connected to the crank of said crank-shaft by a two-part pitman, said two-part pitman connected to said vibrating hanger, substantially as described.

4. In a mowing-machine a gearing-frame, a coupling-frame pivoted thereto, a reciprocating cutting device pivotally connected to said coupling-frame, lifting mechanism adapted to raise and sustain the cutting apparatus at both inner and outer end simultaneously, combined with a separate lifting-lever and supplemental spring adapted to raise the outer end of the cutting apparatus to a higher position, at the will of the attendant, substantially as described.

5. In a mowing-machine a gearing-frame, a coupling-frame pivoted thereto, a reciprocating cutting device pivotally connected to said coupling-frame, lifting mechanism adapted to raise and sustain the cutting apparatus at both inner and outer end simultaneously, combined with a spring adapted to raise the outer end of the cutting apparatus to a higher position, at the will of the attendant, and a pivoted arm to which the spring is connected so that the line of draft of the spring shall cross the axis of movement of said arm and thus render the spring inoperative while the cutting apparatus is in working position, substantially as described.

6. In a mowing-machine a gearing-frame, a coupling-frame pivoted thereto, a reciprocating cutting device pivotally connected to said coupling-frame, lifting mechanism adapted to raise and sustain the cutting apparatus at both inner and outer end simultaneously, combined with a spring adapted to raise the outer end of the cutting apparatus to a higher position, at the will of the attendant, and a pivoted arm to which the spring is connected so that the line of draft of the spring shall cross the axis of movement of said arm and thus render the spring inoperative while the cutting apparatus is in working position, said arm having as one piece therewith a lever controllable by the operator, substantially as described.

7. In a mowing-machine, the main gearing-carriage, a crank-shaft mounted therein, the coupling-frame pivoted thereto, the cutting apparatus pivoted to the said coupling-frame, a two-part pitman connecting said crank to said cutting apparatus, a down-hanger controlling the said two-part pitman, said down-hanger clasping the two parts of said two-part pitman where joined, substantially as described.

8. In a mowing-machine, a gearing-frame, a coupling-frame pivoted thereto, a swivel-hinge F, a cutting apparatus pivotally connected thereto and having a reciprocating knife, a crank upon the gearing-frame, a pitman in two parts connecting the crank and reciprocating knife, and means supported by the swivel-hinge for supporting and guiding the pitman at the junction of its two parts, substantially as described.

In testimony whereof I have signed my name to this specification in the presence of two subscribing witnesses.

JOHN W. LATIMER.

Witnesses:
ALBIN R. PETERSON,
EDW. BASSETT.